Patented Oct. 10, 1950

2,525,628

UNITED STATES PATENT OFFICE 2,525,628

PREPARATION OF ORGANIC PEROXIDE POLYMERIZATION CATALYSTS

James H. Young, Niagara Falls, N. Y., assignor to E. I. du Pont de Nemours & Company, Wilmington, Del., a corporation of Delaware No Drawing. Application August 2, 1946, Serial No. 687,975

6 Claims. (Cl. 252—426)

This invention relates to improved organic peroxide catalysts, their preparation and their use in effecting polymerizations of vinyl esters such as vinyl acetate.

In the addition polymerization of ethylenically unsaturated organic compounds, it is frequently the practice to accelerate the rate of polymerization by the use of various types of polymerization catalysts which include organic peroxides and various metal salts, e. g., salts of the Friedel-Crafts type. Among the peroxide type catalysts which have been proposed for such use are the acyl peroxides, aldehyde peroxides, ether peroxides, hydroperoxides, hydrogen peroxide and persalts. The catalyst employed for a given polymerization generally depends upon the monomer being polymerized, the manner in which the polymerization is to be carried out, and the properties desired in the resulting polymer.

Heretofore the most satisfactory peroxide type catalysts for the polymerization of vinyl acetate have generally been considered to be the acyl peroxides such as benzoyl peroxide for solution or granular polymerization, hydrogen peroxide in a buffered aqueous system, and hydrogen peroxide activated with a suitable reducing agent for emulsion polymerization. Hydrogen peroxide is not an active catalyst for the polymerization of vinyl acetate in organic solvents or when the polymerization is carried out massively. Benzoyl peroxide is used effectively for such polymerizations but is expensive and its use is hazardous since it is subject to detonation by shock or heat. Furthermore, in continuous solvent polymerization systems the use of benzoyl peroxide is also unsatisfactory due to the difficulties encountered in continuously feeding a solid potentially explosive material to the system.

It is an object of the invention to provide highly active organic peroxide catalysts for the polymerization of vinyl esters of the type indicated below and a simple practical method of preparing and using such catalysts. A further object is the provision of a method for preparing such catalysts which may be handled conveniently and used safely in solution form in the polymerization of vinyl acetate and other vinyl esters, particularly in the solution method of polymerizing such compounds. These and still further objects will be apparent from the ensuing description.

The above objects are accomplished in accordance with the invention by reacting a vinyl ester of the type defined below with an aqueous solution of an inorganic peroxygen compound such as hydrogen peroxide or a persalt such as sodium perborate which solution has an initial pH of at least 7. The proportions of the reactants employed should be such that an aqueous and a liquid vinyl ester phase remain throughout the reaction, the ester phase being finally separated from the aqueous phase and containing the active organic peroxide resulting from the reaction. The solution of active catalyst so obtained may then be employed as the source of catalyst in polymerization systems containing a vinyl ester to be polymerized. Thus the vinyl ester extract of the active catalyst may itself be polymerized, e. g., by heating, or it may be added to a polymerization medium in which more of the vinyl ester is to be polymerized, or further quantities of the vinyl ester may be added to the extract and the resulting mixture subjected to polymerization conditions.

The time of contact between the vinyl ester and the solution of inorganic peroxygen compound is important, since if contact is prolonged the activity of the resulting extract containing the catalyst is decreased, probably due to hydrolysis or decomposition of the active organic peroxide. Generally, short periods of time are sufficient for substantial quantities of the organic peroxide to be formed. Thus mixing the two reactants for only three seconds is sufficient to cause a substantial amount of the active catalyst to be produced and retained in the vinyl ester phase. However, a contact time of from 30 seconds to 5 minutes is preferred. Contact for up to 10 minutes duration generally is not harmful, but a longer contact time is disadvantageous and is not recommended.

The reaction between the vinyl ester and the aqueous solution of the inorganic peroxygen compound to produce the active catalyst material does not proceed at a significant or practical rate when the aqueous solution employed is acidic, i. e. has a pH below 7; hence, solutions having a pH of at least 7 should be used. The preferred pH is 8 to 10.5. Solutions having a higher alkalinity may be used although their use is not generally recommended because of the increased rate of hydrolysis of the vinyl esters at such higher alkalinities.

The concentration of inorganic peroxygen compound in the aqueous solution may be varied over a wide range. Solutions containing as low as 0.1% by weight of the peroxygen compound may be used effectively although solutions containing from 1 to 10% are preferred. Higher concentrations may also be used, thus in the case of hydrogen peroxide concentrations as high as 35% by weight are suitable. When employing an inorganic persalt such as sodium perborate, sodium percarbonate, or the like, concentrations ranging from 1% upwards are very suitable and saturated solutions may be employed very effectively.

As indicated previously the proportions of the reactants used to prepare the solution of the catalyst in a vinyl ester should be so regulated that there will exist throughout the entire reaction a liquid vinyl ester phase. This means, of course, that the vinyl esters will always be employed in excess of the stoichiometric quantity required to react with the inorganic peroxygen compound. When employing aqueous solutions containing from around 1 to 10% of the inorganic compound, it is generally preferred to use approximately equal volumes of the two reactants although good results may be obtained using from 0.5 to 10 volumes of the ester per volume of the aqueous solution, depending upon the concentration of the peroxygen compound in the aqueous solution used.

The reaction between the vinyl ester and the aqueous solution of the inorganic peroxygen compound occurs very readily at ordinary temperatures e. g., at 20 to 30° C. and such temperatures are preferred. Lower or higher temperatures, e. g., from 0 to 40° C. may also be used.

The chemical identity of the active organic peroxide ingredient, or ingredients, of the catalyst solutions obtained by the present method has not been established. Several organic peroxide products are theoretically possible. Thus when vinyl acetate is the vinyl ester reacted, the formation of peracetic acid, acetaldehyde peroxide, diacetyl peroxide or a peroxide formed by the reaction of the inorganic peroxide, or one of the above organic peroxides, at the double bond of the vinyl radical is possible. Perhaps mixtures of peroxides are formed. It is very difficult by means of present analytical methods to establish the identity of the active organic peroxide product or products formed. However, since the catalyst solution obtained has been found to be substantially more active as a polymerization catalyst than peracetic acid prepared by known methods, it is believed that peracetic acid is not the active constituent and if present at all in the catalyst solution obtained from vinyl acetate, it is present in minor amounts.

The present catalyst solutions may be handled safely in the dilute solutions as formed without danger of explosions. However, if, for example, the vinyl acetate solution is allowed to evaporate, a residue remains which is explosive with shock. Since the solutions contain as solvent a polymerizable material they tend to polymerize upon long standing at ordinary temperature. The rate of polymerization of the solution may be inhibited by cooling if desired although it has been found to be more desirable and convenient in view of the ease with which the catalyst solution may be prepared to use the catalyst as soon as it is made. In large scale operations very satisfactory results are obtained by preparing the catalyst by a continuous method at a rate equal to the rate of use so as to eliminate the catalyst storage problem.

The catalysts obtained by means of the present invention, i. e., the solutions of the active organic peroxide dissolved in an excess of the vinyl ester, are most active when they are as free as possible from inorganic peroxygen compounds since compounds such as hydrogen peroxide have been found to have an inhibiting effect upon the polymerizing activity of such catalysts. Accordingly, when the inorganic peroxygen compound employed is retained in substantial concentrations, i. e. concentrations corresponding to more than about 0.003% by weight of inorganic active oxygen, in the ester phase of the reaction mixture, the ester extract of the catalyst should be subjected to an aqueous wash to remove as much as possible of the inorganic compound. Such washing treatment, which may be carried out effectively employing, for example, ordinary water or a 5% ammonium sulphate solution as the washing agent, is particularly important when employing hydrogen peroxide as a reactant. When using an inorganic persalt, however, the amount of inorganic peroxide extracted into and retained by the vinyl ester phase is generally relatively small in view of which the washing treatment ordinarily is not required. Thus when using sodium perborate as the inorganic peroxygen compound washing is not necessary since the inorganic peroxide extracted by the vinyl ester will be on the order of 0.001% by weight or less expressed as percent active oxygen. Such quantities are insufficient to have any substantial effect upon the polymerizing effectiveness of the active catalyst in the ester phase when the extract is employed as the source of catalyst in polymerization systems.

The catalyst solution obtained as described above may itself be polymerized by subjecting it to long standing at ordinary temperatures or by heating it to higher temperatures. However, the concentration of the active peroxide catalyst therein is generally considerably higher than desired in polymerization reactions in view of which the catalyst may be added to a polymerization mixture in such amounts as will produce in that mixture the desired concentrations of the catalyst. The present catalysts may be used effectively to polymerize vinyl esters of the type defined below in any of the well-known polymerization systems, e. g., in massive, solvent or emulsion polymerization systems. However, use of the catalyst in either the massive or solution systems, particularly the latter, gives best results. Catalyst concentrations in such systems should generally be within the range 0.0001 to 0.2% by weight of organic active oxygen in the mixture, the preferred concentration being 0.0005 to 0.1% by weight. Polymerization may be effected at the usual temperatures employed, e. g., temperatures ranging from 50 to 150° C. and generally from 50 to 100° C.

Catalysts prepared in accordance with the present invention are useful for accelerating the polymerization of vinyl esters of carboxylic acids in general, specific examples of such esters being the vinyl esters of acetic, propionic, butyric, stearic, oleic, chloracetic, benzoic and phthalic acids. Their use in the polymerization of vinyl esters of saturated, aliphatic monocarboxylic acids, which are more commonly employed in polymerizations, is preferred. The most preferred embodiment of the invention involves the preparation of catalyst from vinyl acetate and the use of that catalyst in the polymerization of vinyl acetate by the solution polymerization method employing as solvent or diluent any of the various organic solvents commonly employed in such systems. Specific examples of suitable solvents are: toluene and benzene; various alcohols such as methanol, ethanol, butanol and the like; saturated cyclic ethers such as dioxane, tetrahydrofuran and tetrahydropyran; and, organic esters such as methyl acetate, ethyl acetate and the like. If desired the vinyl ester being subjected to polymerization may be employed as solvent or diluent by stopping the polymerization so as to leave a substantial amount of unpolymerized ester in the polymerization mixture. The preferred solvent or diluent is methanol, particularly when the ester being polymerized is vinyl acetate. The amount of solvent used should be adjusted so as to maintain concentrations thereof in the polymerization mixture which will be consistent with the desired properties of the resulting polymer. As is well known in the art, the degree of molecular aggregation of the polymer in the finished product is markedly affected by the ratio of solvent to monomer in the mixture. If the ratio of solvent to monomer is high, the molecular weight of the resulting polymer will be low as compared with the molecular weight of polymer prepared employing a lower ratio of solvent to monomer.

Any inorganic peroxide compound soluble in water to the extent of 0.1% by weight or more may be used effectively in preparing the above catalysts. Specific examples of suitable compounds are hydrogen peroxide, alkali metal peroxides such as sodium peroxide, and the various persalts such as the alkali metal perborates, perpyrophosphates, percarbonates and persulphates. The alkali metal perborates and particularly sodium perborate, e. g., sodium perborate tetrahydrate and sodium perborate monohydrate are the preferred reactants since they are readily available and are more effective than the other compounds. In particular, they may generally be reacted with, for example, vinyl acetate to give a vinyl acetate extract of catalyst which is substantially free of inorganic active oxygen without any washing of the extract being required. Regardless which peroxygen compound is used, it is necessary that the aqueous solution thereof have an initial pH of at least 7 and preferably 8 to 10.5. In general no pH adjustment is required, except when employing such strongly alkaline compounds as sodium peroxide or such a weakly acidic material as hydrogen peroxide. When adjustment of pH is necessary, the usual inorganic alkalizing materials such as sodium hydroxide, alkaline phosphates, sodium carbonate or bicarbonate and the like may be used to adjust hydrogen peroxide solutions; and any of the common inorganic acidic materials such as sulphuric acid, hydrochloric acid, phosphoric acid, etc., may be employed to adjust the pH of solutions of sodium peroxide.

The following examples further illustrate the invention. In the examples and the accompanying tables, the term "extract catalyst" is used to mean the solution of the active organic peroxide catalyst in the vinyl ester, which solution is obtained by separating from the catalyst reaction mixture the non-aqueous or vinyl ester phase. The abbreviations "A. O.," "O. A. O." and "I. A. O." are used in the examples to mean, respectively, "active oxygen," "organic active oxygen" and "inorganic active oxygen."

*Example 1*

To 500 ml. of water sufficient sodium bicarbonate was added to give a pH of 8.2. 7.6 ml. of 35% hydrogen peroxide were added and the entire mixture was placed in a separatory funnel to which was added 250 ml. of vinyl acetate. After shaking briefly the layers were separated. 45 g. of the extract catalyst obtained were added to a flask containing 135 g. of untreated vinyl acetate and 180 g. of methanol. After heating the mixture for one hour 50.6% of the vinyl acetate had polymerized. After 2½ hours 89.7% had polymerized.

*Example 2*

This example shows the use of the present extract catalyst in a massive polymerization of vinyl acetate. 200 g. of extract catalyst were prepared as described in the above example. 16 g. of previously prepared low viscosity vinyl acetate polymer was placed in a polymerization flask and heated to about 90° C. The extract catalyst was then added dropwise to the polymerization flask at a rate such that a temperature of about 90° C. was maintained. After about one hour 150 g. of the extract catalyst had been added and a viscous polymer which hardened on cooling to room temperature was obtained. The product had a viscosity of 7.0 cp., determined for a benzene solution at 20° C. containing 86 g. of the polymer per liter.

*Example 3*

50 ml. of water, 25 ml. of 27.6% hydrogen peroxide solution, 1 g. of sodium bicarbonate and 75 ml. of vinyl acetate were placed in a flask and cooled to about 8° C. The flask was shaken by hand and the temperature rose in 5 minutes to 21° C. The vinyl acetate layer was separated in a separatory funnel at room temperature and a portion of the vinyl acetate extract was washed twice with an equal volume of water to remove therefrom traces of hydrogen peroxide. 20 g. of the washed extract which analyzed 0.0013 g. of A. O. per ml. were placed in one polymerization flask along with 20 g. of methanol. In a second polymerization flask 25 g. of the vinyl acetate extract which had not been washed with water were placed along with 25 g. of methanol. The vinyl acetate extract added to this second flask contained 0.0047 g. per ml. of A. O. The two flasks were then heated under reflux. The vinyl acetate in the first flask was 91% polymerized after one hour whereas polymerization in the second flask was only 50% completed. After two hours, polymerization in the first flask was 97.5% complete whereas the extent of polymerization in the second flask was 91%. The results of this experiment show the inhibiting effect of hydrogen peroxide upon the activity of the extract catalyst. Thus, the first polymerization flask wherein extract catalyst which had been washed to free it from hydrogen peroxide polymerized almost twice as fast during the first hour as the sample containing the same catalyst which has not been washed.

*Example 4*

This example shows the batch reaction of sodium perborate tetrahydrate solutions with vinyl acetate. In the separate experiments equal volumes of 1 to 3% solutions of sodium perborate tetrahydrate and vinyl acetate were shaken for from 3 to 300 seconds. The layers were then separated and then the extract catalyst layers analyzed for total A. O., using a standard ferrous sulfate colorimetric method. They were also analyzed for I. A. O. by a standard ceric ammonium sulfate method and in all cases the I. A. O. content was 0.001% by weight or less. After carrying out such analyses the remainder of the extract catalyst in each experiment was diluted with an equal volume of methanol and heated to reflux to determine the extent of polymerization occurring in one hour at that temperature. Details of the individual experiments and the results obtained are shown in the following table.

| Exp. | Perborate Solution | | | Mixing Time, sec. | A. O. in Extract, Per Cent | Per Cent Polymerized |
|---|---|---|---|---|---|---|
| | Conc., Per Cent | pH Before | pH After | | | |
| A | 1.4 | 10.1 | 6.5 | 3 | 0.068 | 24 |
| B | 1.4 | 10.1 | 8.6 | 120 | 0.105 | 58 |
| C | 1.4 | 10.1 | 8.4 | 300 | 0.100 | 65 |
| D | 2.9 | 10.1 | ---- | 10 | 0.107 | ---- |
| E | 2.0 | 10.1 | 7.5 | 60 | 0.085 | ---- |
| F | [1] 2.0 | 10.1 | ---- | 60 | 0.153 | 84 |

[1] Used 2 volumes per 1 volume of vinyl acetate.

*Example 5*

This example illustrates a continuous method of preparing the catalyst. Streams of a sodium perborate solution and vinyl acetate were fed continuously counter-currently through a water-cooled 25 mm. glass tube 30 in. long held in a vertical position. Spent perborate solution was removed continuously from the bottom and extract catalyst from the top. The following table shows the results obtained in several experiments carried out in the above general manner, employing perborate solutions of various concentrations. In each instance the I. A. O. content of the catalyst extract obtained did not exceed 0.001%. The catalyst extracts were diluted with equal volumes of methanol and heated under reflux to determine the extent of polymerization in one hour under those conditions.

| Exp. | Perborate Solution | | | | Vinyl Acetate, Ml./min. | A. O. in Extract, Per Cent | Per Cent Polymerized |
|---|---|---|---|---|---|---|---|
| | Conc., Per Cent | Ml./min. | pH Before | pH After | | | |
| A | 1.0 | 9 | 10.1 | 6.2 | 10 | 0.031 | 30 |
| B | 1.0 | 25 | 10.1 | 6.3 | 1 | 0.030 | 51 |
| C | 2.1 | 12.5 | 10.1 | 5.5 | 10 | 0.093 | 24 |
| D | 3.5 | 16 | 10.3 | 6.3 | 11 | 0.060 | 26 |
| E | 3.5 | 22 | 10.3 | ---- | 5 | 0.106 | 62 |

*Example 6*

This example illustrates the preparation of extract catalyst by a batch method and the use of that catalyst in a relatively large scale continuous solution polymerization system. The polymerization equipment included a 31 gallon maximum working volume vessel equipped with a steam heating jacket and a 6 in. diameter pitched blade propeller agitator turning at 450 R. P. M. The vessel was equipped with a gage glass, sight port, a bottom drain, a thermowall, a reflux condenser, inlets for extract catalyst and for vinyl acetate monomer and a constant level overflow box from which polymerization mixture overflowed. The mixture thus removed from the polymerization vessel was fed to a stripper for removing unpolymerized monomer and methanol which was used as solvent, the stripped material being fed back continuously to the polymerizer along with sufficient additional methanol to maintain the desired methanol to vinyl acetate ratio in the polymerization mixture.

The extract catalyst employed was made by shaking together vinyl acetate and sodium perborate solutions for various periods of time, separating the vinyl acetate layer containing the active catalyst and then using that catalyst in the continuous polymerization system described above. Various batch preparations of the extract catalyst were made with results indicated below.

| Experiment | A | B | C | D |
|---|---|---|---|---|
| Weight ratio Perborate Solution to Vinyl Acetate | 0.9 | 1.0 | 1.0 | 3.0 |
| Per Cent I. A. O. in Perborate Solution | 0.172 | 0.169 | 0.180 | 0.188 |
| Per Cent O. A. O. in Extract Catalyst | 0.068 | 0.0584 | 0.118 | 0.184 |
| Per Cent O. A. O. in Spent Perborate Solution | 0.014 | 0.006 | 0.002 | 0.006 |
| pH of Perborate Solution Before | 10.2 | 10.1 | 10.1 | 10.0 |
| pH of Perborate Solution After | 7.9 | 6.7 | 8.2 | 6.9 |
| Time of Shaking, min | 0.2 | 0.5 | 2.5 | 2.0 |
| Total A. O. Recovery, Per Cent | 49.0 | 35.0 | 64.0 | 33.5 |
| A. O. Recovery in Extract Catalyst, Per Cent | 40.0 | 31.5 | 63.0 | 30.0 |
| A. O. Recovery in Spent Perborate Solution, Per Cent | 9.0 | 3.5 | 1.0 | 3.5 |

Employing catalysts prepared as above and containing approximately 0.18% O. A. O. the continuous polymerization of vinyl acetate was carried out in the above described equipment with the following results.

| | |
|---|---|
| Approx. per cent O. A. O. in extract catalyst | 0.18 |
| Extract catalyst, per cent of fresh vinyl acetate fed | 7.0 |
| O. A. O fed, per cent of fresh vinyl acetate fed | 0.013 |
| Per cent polymerized | 76 |
| Retention time, hours | 6.4 |
| Lb./hr. polymer made | 19.5 |
| Polymer, lb./hr./poly. gallon | 0.67 |
| Ratio methanol: Vinyl acetate in polymerizer | 2.3 |
| Polymer viscosity, approx cp | 5.1 |

While excellent results are obtained employing the batch method for preparing the catalyst, more consistent and better results are realized when effecting reaction between the vinyl acetate and, for example, sodium perborate by a continuous method. A continuous counter-current method was illustrated in Example 5. The continuous method may also be carried out by a co-current method and while good results may be achieved employing either of these continuous methods best results to date have been achieved using the co-current continuous method illustrated by the following example.

*Example 7*

Equipment for preparing the catalyst consisted of a 20 mm. diameter medium porosity sintered glass disc sealed into the lower end of a vertical piece of glass tubing 2 in. long and 20 mm. diameter. The tube was surmounted by a 30 in. length of 12 mm. tubing and the vinyl acetate was fed upwardly through the porous plate while the perborate solution was fed into the 20 mm. diameter tube through an 8 mm. side arm positioned just above the plate so as to direct the solution at the center of the plate. As the mixture of materials was removed from the top they formed into two layers which were separated. The average contact time of the two solutions with each other varied from around 2 to 6 minutes. Results of 4 experiments are shown in the table below.

| Experiment | A | B | C | D |
|---|---|---|---|---|
| Ester Fed, lbs./hr. | 1.4 | 1.4 | 2.1 | 2.0 |
| Lbs. Perborate Soln.:Lb. Ester | 2.4 | 3.1 | 0.81 | 3.1 |
| Per Cent I. A. O. in Perborate Soln. | 0.185 | 0.203 | 0.176 | 0.176 |
| Per Cent I. A. O. in Spent Perborate Soln. | nil | nil | nil | nil |
| pH Perborate Soln. Before | 10.0 | 9.9 | 10.1 | 10.1 |
| pH Perborate Soln. After | 8.1 | 7.9 | 8.0 | 7.4 |
| Per Cent O. A. O. in Extract | 0.163 | 0.204 | 0.077 | 0.171 |
| Per Cent O. A. O. in Spent Perborate Soln. | 0.004 | 0.027 | 0.005 | 0.009 |
| Total O. A. Recovery, Per Cent | 39.2 | 45 | 56.2 | 36.9 |
| A. O. Recovered as O. A. O. in Extr. Per Cent | 37.0 | 32 | 53.4 | 31.8 |
| Contact Time, Min. | 3.0 | 2.3 | 5.9 | 1.6 |

Extract catalyst prepared as indicated in the above table was employed in a polymerization run using the method and equipment described in Example 6. The run was of 220 hours duration and a total of 3980 lbs. polymer were prepared. During the run, the ratio of methanol to vinyl acetate monomer in the polymerization mixture was varied between 1.4–4.0 and the viscosity of the product varied from 4.6–6.1 cp. (the viscosity at 20° C. of a benzene solution containing 86 g. of polymer per liter). The data given below are for the 200th hour of operation and are typical.

| | |
|---|---|
| Per cent O. A. O. in extract catalyst used | 0.16 |
| Extract catalyst fed, per cent of fresh vinyl acetate fed | 9.0 |
| O. A. O. fed, per cent of fresh vinyl acetate fed | 0.014 |
| Per cent polymerized | 69 |
| Retention time, hours | 5.6 |
| Lbs./hr. of polymer made | 15.5 |
| Polymer, lbs./hr./poly. gallon | 0.55 |
| Ratio methanol: Vinyl acetate in polymerizer | 2.1 |

*Example 8*

100 ml. of a 5% water solution of sodium percarbonate having a pH of 10.2 was shaken briefly with 100 ml. of vinyl acetate in a separatory funnel. The layers were then separated and the water layer found to have a pH of 7.2. The vinyl acetate layer containing 0.0005% I. A. O. and 0.13% O. A. O. by weight. The vinyl acetate layer was 79.6% polymerized after refluxing for one hour.

*Example 9*

Sodium perpyrophosphate, 2 grams, was dissolved in 100 ml. of water and the resulting solution shaken with 100 ml. of vinyl acetate for 2 minutes in a separatory funnel. The vinyl acetate layer was separated and dried over anhydrous sodium sulfate for 2 hours. The dried material had thickened considerably after only 15 minutes of refluxing when 16.6% of the vinyl acetate had polymerized.

*Example 10*

A 2% solution of sodium perborate was adjusted by addition of acetic acid to a pH of 7.0. 100 ml. of this solution were shaken thoroughly for a short time with an equal volume of vinyl acetate. The vinyl acetate layer was then separated and dried over sodium sulfate. Upon refluxing 50 ml. of the dried extract with an equal volume of fresh vinyl acetate for 40 minutes, 19% of the vinyl acetate was polymerized. Had a more alkaline perborate solution been used, a more active extract catalyst would have been obtained.

*Example 11*

Example 10 was repeated except that the perborate solution was adjusted to a pH of 6.5 with acetic acid before use. Only 1.2% of the vinyl acetate was polymerized.

*Example 12*

A water solution of sodium perborate was adjusted to a pH of 4.8 with acetic acid. Analysis of the solution by the ceric sulfate method showed 0.133% by weight of active oxygen. After shaking the solution with an equal volume of vinyl acetate for several minutes, the aqueous layer was found to contain 0.12% active oxygen by the ceric sulfate method. The experiment was repeated but without adjusting the pH of the perborate solution before use. Analysis of the water layer after shaking with the vinyl acetate showed that it was substantially free from both inorganic and organic active oxygen.

Examples 11 and 12 demonstrate that the reaction between vinyl acetate and an aqueous solution of inorganic peroxygen compound does not proceed at a practical rate when the aqueous solution of the peroxygen compound is initially acidic. Example 10 shows that the rate of reaction is appreciable when the aqueous solution has a pH of 7 and, as stated previously, it is preferred to employ an aqueous solution of an inorganic peroxygen compound having an initial pH of 8 to 10.5.

The above examples illustrate specifically the use of vinyl acetate as the vinyl ester in preparing the extract catalyst and also as the ester polymerized by such catalyst. Active extract catalysts have been similarly prepared from vinyl laurate and vinyl benzoate. The invention may be practiced employing other vinyl esters of carboxylic acids. The vinyl ester may be the ester of a saturated or unsaturated, aliphatic or carbocyclic, mono- or dicarboxylic acid. However, it is preferred to employ vinyl esters of saturated aliphatic monocarboxylic acids, particularly the lower saturated aliphatic monocarboxylic acids such as propionic, butyric, formic and acetic acids.

The present catalysts may also be used to effect copolymerization of such vinyl esters with other polymerizable ethylenically unsaturated compounds, such as ethylene, trichlorethylene, dichlorethyline, vinyl chloride, vinyl cyanide, styrene and esters of acrylic and methacrylic acids, and the like. In employing the present catalysts, the vinyl ester should constitute at least 5% by weight of the total reaction mixture in which polymerization is being effected and may constitute up to approximately 100% of the mixture. The vinyl ester also should constitute at least 5% by weight of the total weight of polymerizable ingredients in the polymerization mixture.

I claim:

1. A process for preparing a composition useful as a catalyst for polymerizing vinyl esters of carboxylic acids comprising reacting at a temperature of 0 to 40° C. an excess of a liquid, water-immiscible monomeric vinyl ester of a monocarboxylic acid with an aqueous solution of an inorganic peroxygen compound having a pH of at least 7 and containing at least 0.1% by weight of said peroxygen compound, employing immiscible proportions of said liquid ester and said solution, and separating from the reaction mixture the liquid monomeric ester phase containing an active organic peroxide compound dissolved therein.

2. The process of claim 1 wherein the ester reacted is a vinyl ester of a saturated aliphatic acid.

3. The process of claim 2 wherein the ester reacted is vinyl acetate.

4. The process of claim 3 wherein the inorganic peroxygen compound reacted is sodium perborate.

5. The process of claim 2 wherein the aqueous solution reacted contains 0.1 to 10% of the inorganic peroxygen compound and has a pH of 7 to 10.5.

6. The process of claim 5 wherein the ester phase separated from the reaction mixture is subjected to an aqueous wash.

JAMES H. YOUNG.

REFERENCES CITED

The following references are of record in the file of this patent:

UNITED STATES PATENTS

| Number | Name | Date |
|---|---|---|
| 1,586,803 | Hermann and Baum | June 1, 1926 |
| 1,710,825 | Hermann and Haehnel | Apr. 30, 1929 |
| 2,369,520 | Barnes | Feb. 13, 1945 |
| 2,379,390 | Tuerck | June 26, 1945 |

FOREIGN PATENTS

| Number | Country | Date |
|---|---|---|
| 549,234 | Great Britain | Nov. 12, 1942 |